United States Patent [19]

Fujisawa

[11] Patent Number: 5,183,132
[45] Date of Patent: Feb. 2, 1993

[54] POWER TRANSFER DEVICE HAVING CENTER DIFFERENTIAL GEAR FOR FOUR-WHEEL DRIVE VEHICLE

[75] Inventor: Mutsumi Fujisawa, Okazaki, Japan

[73] Assignee: Mitsubishi Jidosha Kogyo Kabushiki Kaisha, Tokyo, Japan

[21] Appl. No.: 609,914

[22] Filed: Nov. 6, 1990

[30] Foreign Application Priority Data

Nov. 10, 1989 [JP] Japan .................. 1-130554[U]

[51] Int. Cl.$^5$ ............................................. B60K 17/352
[52] U.S. Cl. .................................... 180/247; 180/250; 74/339; 192/53 F; 475/250
[58] Field of Search ............... 180/247, 248, 249, 250; 475/221, 200, 248, 250, 231, 237; 74/339; 192/53 F

[56] References Cited

U.S. PATENT DOCUMENTS

| | | | |
|---|---|---|---|
| 2,221,892 | 11/1940 | Orr | 192/53 F |
| 4,804,061 | 2/1989 | Kameda | 180/250 |
| 4,907,473 | 3/1990 | Fujitani et al. | 180/250 |

*Primary Examiner*—David M. Mitchell
*Assistant Examiner*—Anne Marie Boehler
*Attorney, Agent, or Firm*—Abelman, Frayne & Schwab

[57] ABSTRACT

A power transfer device having a center differential gear unit for use in a four-wheel drive vehicle of part time four-wheel drive type of the present invention comprises: an intermediate shaft which is rotatably provided around a rotary shaft, which rotary shaft is driven to transmit the driving power of an engine and connected with one of the output elements of the center differential gear unit, and which is detachably connected with the rotary shaft through the first clutch mechanism; and an output shaft which is rotatably provided around the intermediate shaft and detachably connected with the intermediate shaft through the second clutch mechanism having a synchro-mesh unit, wherein the transmission can be optionally changed over among the two-wheel drive state in which the center differential gear unit is locked, the four-wheel drive state in which the center differential gear unit is locked, and the four-wheel drive state in which the center differential gear is released, by moving the sleeve in the first clutch mechanism.

5 Claims, 10 Drawing Sheets

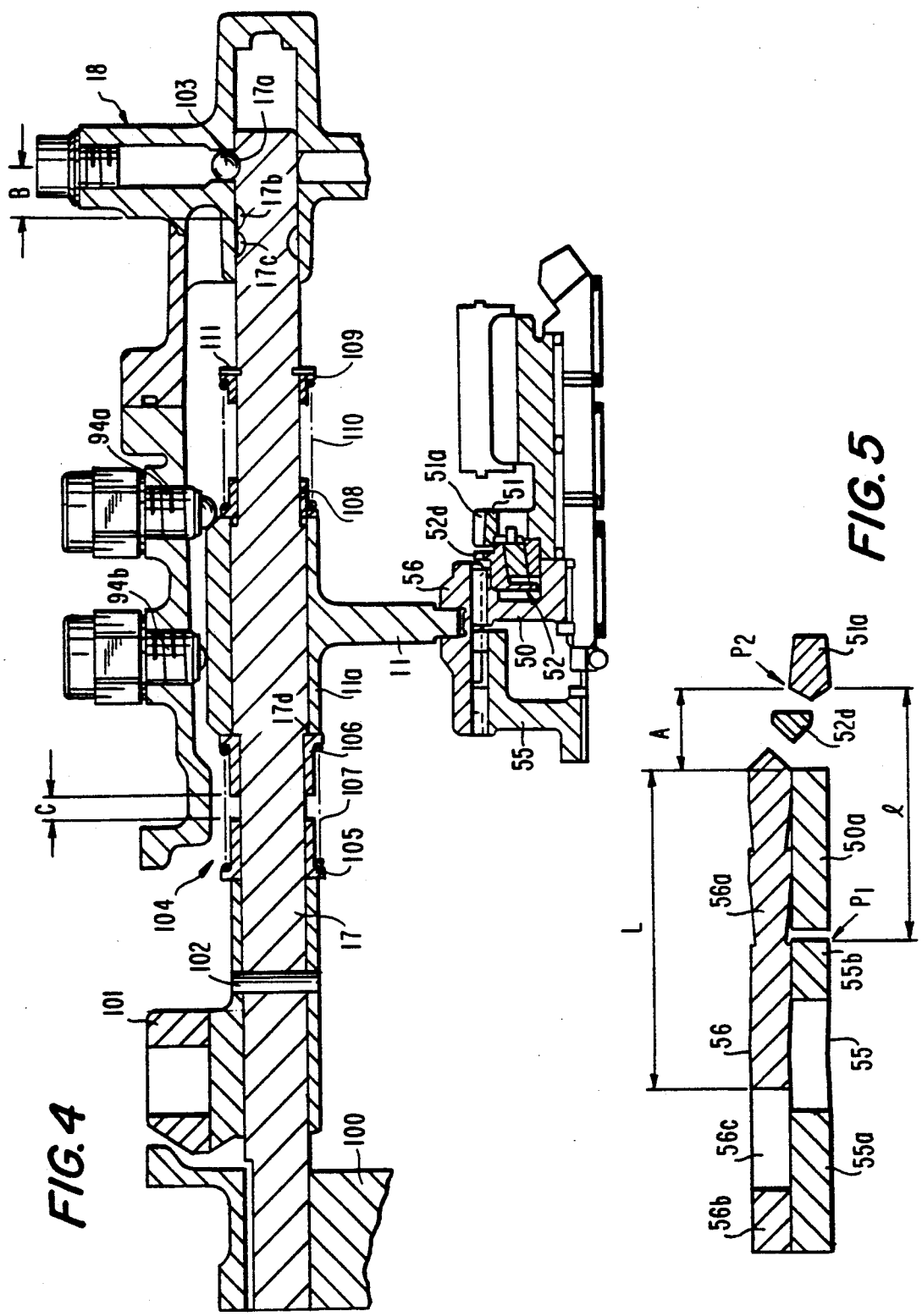

FIG. 6
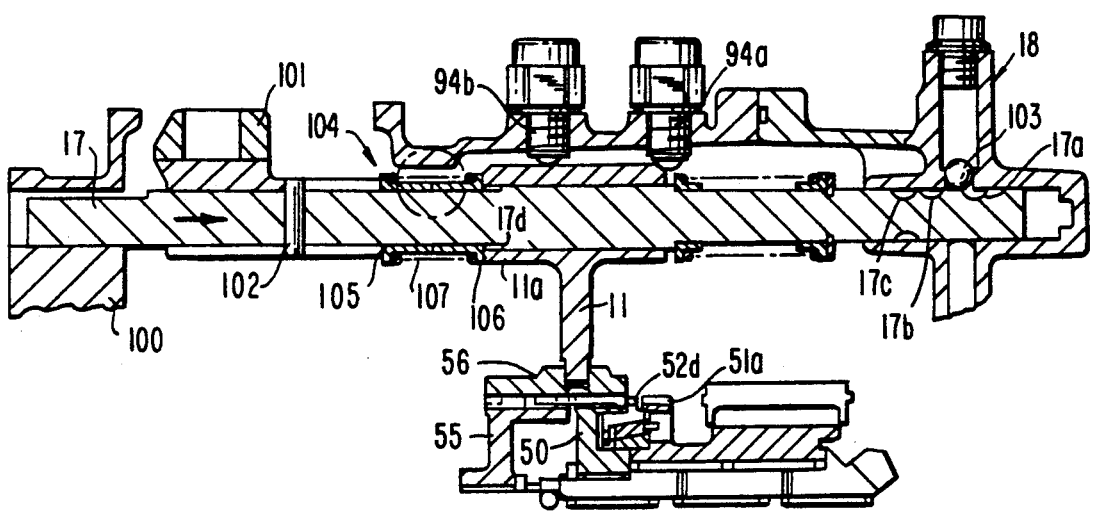
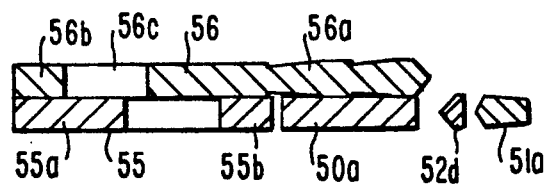
FIG. 7

FIG. 8
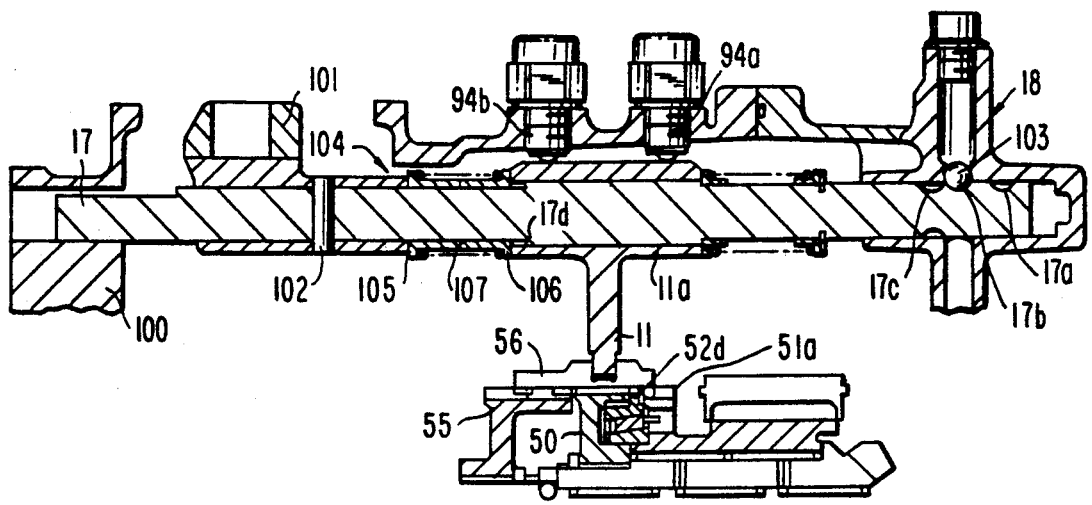
FIG. 9
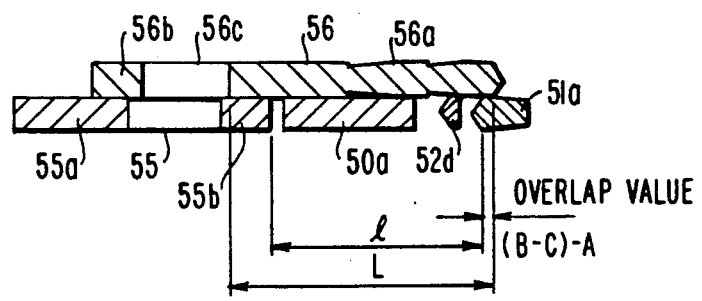
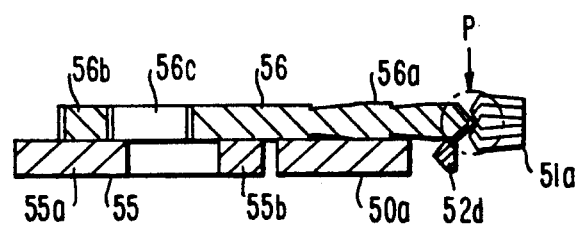
FIG. 10

FIG. 13
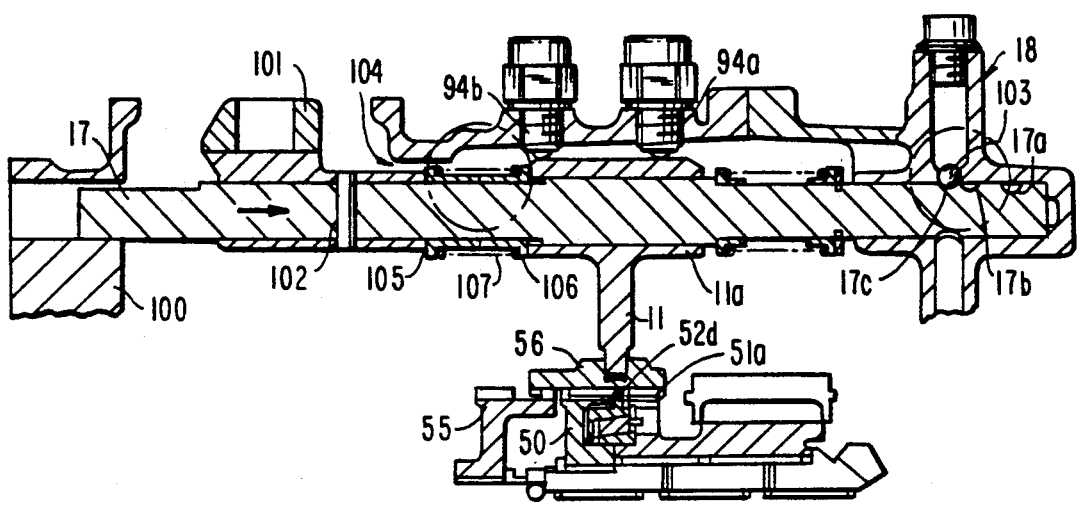
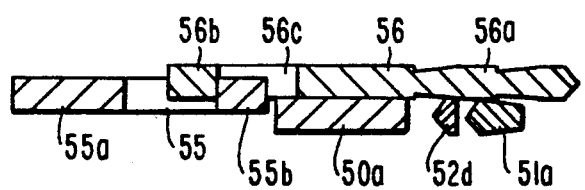
FIG. 14

POWER TRANSFER DEVICE HAVING CENTER DIFFERENTIAL GEAR FOR FOUR-WHEEL DRIVE VEHICLE

BACKGROUND OF THE INVENTION

The present invention relates to a power transfer device for use in a four-wheel drive vehicle of part-time four-wheel drive type being changed over between the state of two-wheel drive and the state of four-wheel drives, and having a center differential gear unit which distributes the drive force of an engine to the front and rear road wheels.

In conventional power transfer devices for four-wheel drive, there has been provided a part-time four-wheel drive type other than a full-time four wheel drive type. Specifically, in the vehicle of part-time four-wheel drive type, it is possible to change over between the two-wheel drive state and the four-wheel drive state. Since the vehicle of part-time four wheel-drive type is advantageous that the drive force can be positively transmitted to road wheels and the driver can enjoy driving operation, there has been a great demand for the vehicle of part-time four wheel drive type, so that the maneuverability of the vehicle has been improved.

In the vehicle of part-time four-wheel drive type, a power transfer is provided which can change over between the two-wheel drive state and the four-wheel drive state. The power transfer called a two-speed power transfer has been developed in which the low speed four-wheel drive for running on a road of a terrible condition and the high speed four-wheel drive for running on a road of normal condition, can be selected.

For example, FIG. 17 is a schematic illustration of the two-speed power transfer. The two-speed power transfer 1 comprises: the H/L changeover mechanism 3 that can change the speed of the input shaft 2 to which the drive force of an engine not illustrated is transmitted, wherein the rotation speed of the input shaft 2 can be changed over between a high speed and a low speed; the rotary shaft 4 which is provided on the production of the input shaft 2 in order to transmit the drive force to the rear wheel side not illustrated through the H/L changeover mechanism 3; and the 2/4 changeover mechanism 5 which can change over between the two-wheel drive state and the four-wheel drive state by transmitting the drive force of the rotary shaft 4 to the front wheel side not illustrated or intercepting the drive force so that the changeover can be made between the two-wheel drive state and the four wheel drive state.

The H/L changeover mechanism 3 comprises: the input gear 21 which is integrally provided to the edge portion of the input shaft 2; the input hub 22 which is coaxially mounted on the input gear 21 the output hub 23 integrally mounted on the edge portion of the rotary shaft 4 which drives the rear wheels; the tubular shaft 24 which is coaxially and rotatably provided around the rotary shaft 4; the H/L changeover hub 25 which is integrally provided to the tubular shaft 24; the H/L changeover gear 26 which is coaxially mounted on the H/L changeover hub 25; the first low speed gear 27 which is supported by the countershaft 6 provided in parallel with the input shaft 2 and the rotary shaft 4, and which engages with the input gear 21; the second low speed gear 28 which is supported by the countershaft 6 and engaged with the H/L changeover gear 26; the H/L changeover sleeve 8 which is provided around the circumference of the input hub 22, the output hub 23 and the H/L changeover hub 25, and which can engage with either of the hub 22, 23 or 25; and the H/L changeover shift fork 9 which moves the H/L changeover sleeve 8.

When the H/L sleeve 8 is set to the H position in which the H/L sleeve 8 engages astride with both the input hub 22 and the output hub 23 as illustrated in FIG. 17, the rotary shaft 4 is rotated at the same speed as the input shaft 2. On the other hand, when the H/L changeover sleeve 8 is set to the L position in which the H/L changeover sleeve 8 engages astride with both the output hub 23 and the H/L changeover hub 25, the rotary shaft 4 is rotated at a lower speed than the input shaft 2 through the gears 21, 27, 28 and 26. On the other hand, when the H/L sleeve is set to the N position in which the H/L sleeve engages only with the output hub 23, the drive force of the input shaft 2 is not transmitted to the rotary shaft 4.

The 2/4 changeover mechanism 5 comprises: the hub 31 which is mounted on the rotary shaft 4 so that it can be rotated integrally with the rotary shaft 4; the tubular shaft 32 which is coaxially and rotatably provided around the rotary shaft 4; the 2/4 changeover hub 33 which is integrally mounted on the tubular shaft 32; the 2/4 changeover sleeve 10 which is provided around the hub 31 and the ¼ changeover hub 33 so that it can be appropriately engaged with either the hub 31 or the hub 33; and the 2/4 shift fork 11 which moves the 2/4 changeover sleeve 10. The said tubular shaft 32 is provided with the front-wheel drive force transmitting sprocket 12 which is rotated integrally with the 2/4 changeover hub 33, and the transfer chain 15 is wound around the front-wheel drive force transmitting sprocket 12 and the front-wheel drive sprocket 14 mounted on the front-wheel drive shaft 13.

When the 2/4 changeover sleeve 10 is set to the two-wheel drive position in which the 2/4 changeover sleeve 10 engages only with the hub 31 as illustrate drive force of the rotary shaft 4 is not transmitted to the front wheel drive shaft 13. On the other hand, when the 2/4 changeover sleeve 10 is set to the four-wheel drive position in which the 2/4 changeover sleeve 10 engages astride with both the hub 31 and the 2/4 changeover hub 33, the drive force of the shaft 4 is transmitted to the front wheel drive shaft 13 through the hub 31, the 2/4 changeover sleeve 10, the 2/4 changeover hub 33, the tubular shaft 32, the front wheel drive force transmitting sprocket 12, the transfer chain 15, and the front wheel drive sprocket 14. In the way described above, the four-wheel drive state can be attained.

However, it should be noted that the said conventional transfer is disadvantageous in that: a tight corner braking phenomenon peculiar to the four-wheel drive may occur when the vehicle passes through a curved path at a low speed; and further while the vehicle is running at a high speed in the state of four-wheel drive, internal circulating torque may be generated according to the difference of the diameter between the front and rear road wheels, which is caused by the difference of air pressure of tires, so that there is a fear that the parts of the drive system are damaged.

In order to solve the problems described above, the method to provide a center differential gear unit to the part-time four-wheel drive vehicle can be proposed, which center differential gear unit can distribute the drive force transmitted from the engine to the front and rear road wheels.

However, when the center differential gear unit is always activated, there will be caused such a problem that an excessive slip occurs during running of the vehicle on a low frictional road.

Therefore, in this case the center differential gear unit must be provided with a locking device so that a selection can be made between the locked state and unlocked state when necessary. Specifically, it is necessary that a selection can be made between: the two-wheel drive in the condition that the center differential gear unit is locked; the four-wheel drive in the condition that the center differential gear unit is free; and the four-wheel drive in the condition that the center differential gear unit is locked.

OBJECT OF THE INVENTION

The first object of the present invention is to provide a power transfer having a center differential gear unit of a four-wheel drive vehicle of part-time four-wheel drive type, wherein the power transfer is characterized in that: a tight corner breaking phenomenon can be prevented in the running of low speed four-wheel drive by simple operation; and further the occurrence of internal circulating torque can be prevented in the running of high speed four-wheel drive.

The second object of the present invention is to provide a power transfer having a center differential gear unit of a four-wheel drive vehicle of part-time four-wheel drive type, wherein the power transfer is characterized in that: the state of two-wheel drive and four-wheel drive can be changed over, and further the free state and locked state of the center differential gear unit can be changed over only by shifting a changeover sleeve even when the vehicle is running.

The third object of the present invention is to provide a power transfer having a center differential gear unit of a four-wheel drive vehicle of part-time four-wheel drive type, wherein the power transfer is characterized in that: the power transfer can be made compact in size and the production cost and assembling cost of the vehicle can be reduced by simplifying the composition of the apparatus.

Further, the fourth object of the present invention is to provide a power transfer having a center differential gear unit of a four-wheel drive vehicle of part-time four-wheel drive type in which the change over sleeve can be smoothly engaged with hubs when the driving state is changed over, so that the power transfer is advantageous in that: the occurrence of ratcheting sound can be inhibited; the damage of the gear unit can be prevented; and noise from the gear unit can be decreased.

SUMMARY OF THE INVENTION

The present invention is to provide a power transfer device having a center differential unit for use in a four-wheel drive vehicle of part-time four-wheel drive type comprising: a rotary shaft to transmit the drive force of an engine; a center differential gear unit which is connected with the said rotary shaft and distributes the drive force from the said engine to the front and rear road wheels; an intermediate shaft which is connected with one of the output elements of the said center differential gear unit, and which is rotatably provided around the said rotary shaft and connected with the said rotary shaft through the first clutch mechanism in such a manner that the intermediate shaft can be connected with and disconnected from the said rotary shaft; and an output shaft which is rotatably provided around the said intermediate shaft, and which is connected with the intermediate shaft through the second clutch mechanism having a synchronizing mechanism in such a manner that the output shaft can be connected with and disconnected from the intermediate shaft, wherein the said first clutch mechanism is composed of a first hub provided to the said intermediate shaft, a sleeve slidably spline-connected with the outer circumference of said first hub, and a second hub which is provided to the said rotary shaft and which can be engaged to and disengaged from the sleeve, and wherein the above described second clutch mechanism is composed of the said first hub, the said sleeve, and a clutch gear which is provided to the said output shaft and which can be connected with and disconnected from the said sleeve through said synchronizing mechanism, and wherein the said sleeve can be moved among the first position in which the sleeve engages with the said first hub and the above-described second hub, the second position in which the sleeve engages with the said first hub and the above-described clutch gear, and the third position in which the sleeve engages with all of the said first hub, the said second hub, and the said clutch gear, and wherein in the said second position, annular grooves, the width of which is wider than the length of the engagement teeth of the said second hub, are formed on the inner circumferential surface opposed to the engagement teeth of the said second hub.

Consequently, when the changeover sleeve is moved and the teeth of the changeover sleeve are simultaneously engaged with the first and second hubs so that the changeover sleeve is not engaged with the clutch gear, the drive force of the engine is transmitted to either the front road wheels or the rear road wheels through the first input shaft and intermediate shaft. In the way explained above, the vehicle becomes the state of two-wheel drive in which the center differential gear is locked.

On the other hand, when the changeover sleeve is moved and the teeth of the changeover sleeve are simultaneously engaged with the second hub and the clutch gear so that the changeover sleeve is not engaged with the first hub, the drive force of the engine is transmitted from the rotary shaft to the first input shaft and the intermediate shaft through the center differential gear unit, and further the drive force is transmitted from the intermediate shaft to the second input shaft through the second hub, the changeover sleeve, and the clutch gear. In the way explained above, the vehicle becomes the state of four-wheel drive in which the center differential gear unit is free.

BRIEF DESCRIPTION OF THE DRAWINGS

FIG. 4 is an enlarged sectional view of the main portion of the power transfer having a center differential gear unit.

FIG. 5 is a sectional view taken in the direction of arrows V—V in FIG. 3.

FIG. 6, FIG. 8, FIG. 11, FIG. 13, and FIG. 15 are enlarged sectional views corresponding to FIG. 4, of the main portion of the power transfer having a center differential tear unit, wherein the 2/4 changeover shift rail is moved in order.

FIG. 7, FIG. 9, FIG. 12, FIG. 14, and FIG. 16 are sectional views respectively corresponding to FIG. 6, FIG. 8, FIG. 11, FIG. 13, and FIG. 15, in which the 2/4 changeover shift rail is moved in order, wherein these drawings are illustrated in the same way as FIG. 5.

FIG. 10 is a sectional view illustrated in the same way as FIG. 5, showing the state in which gear noise is made.

DETAILED DESCRIPTION OF THE PREFERRED EMBODIMENT

Figure 1:
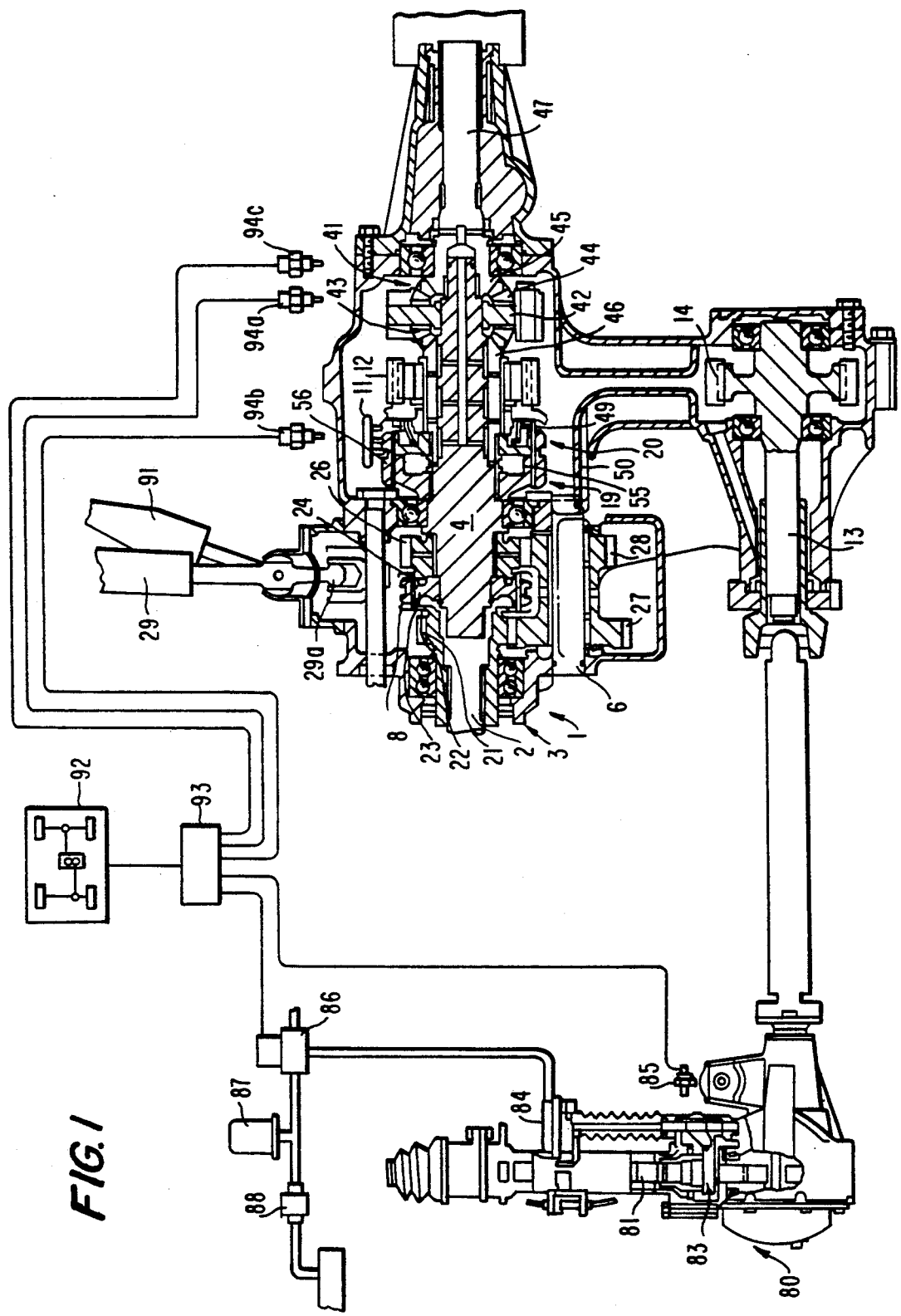
FIG. 1 is a schematic illustration which shows the main portion of the drive system of a four wheel-drive vehicle of part-time four-wheel drive type of an example embodying the present invention.
Figure 2:
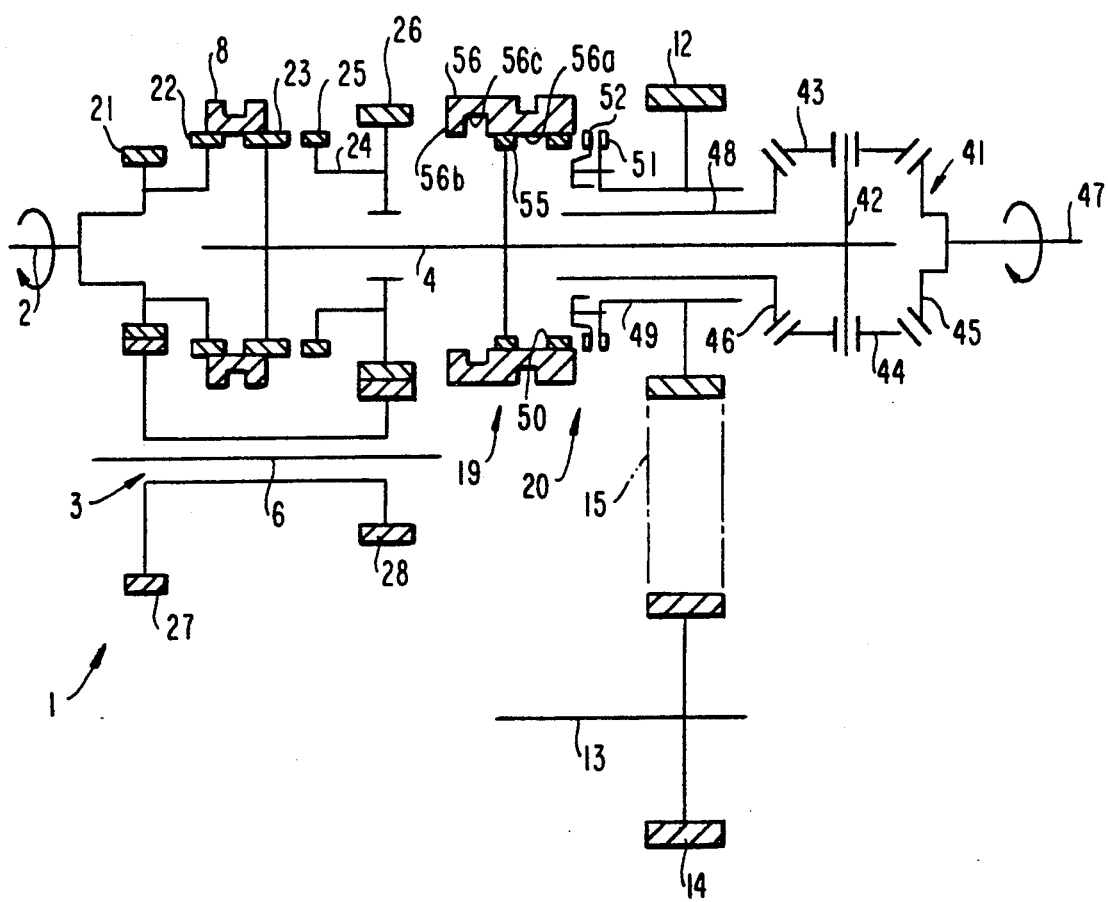
FIG. 2 is a diagrammatical view of the drive system.

Referring now to FIG. 1 to FIG. 16, an example of the power transfer having a center differential gear unit for use in a four-wheel drive vehicle of part-time four-wheel drive type embodying the present invention will be explained as follows. Like reference characters designate like or corresponding parts throughout the several views including FIG. 17, and the explanations will be omitted.

The power transfer of this example is a two-speed type transfer which can change over between a high speed and a low speed. As illustrated in FIG. 1 in which the main portion of the drive system of the four-wheel drive vehicle of part-time four-wheel drive type is illustrated, and in FIG. 2 in which the drive system is diagrammatically illustrated, the power transfer of the present invention comprises: the H/L changeover mechanism 3 which changes over the rotation speed of the input shaft 2 driven by an engine between a high speed and a low speed, wherein the composition of the changeover mechanism 3 is the same as the conventional apparatus; the rotary shaft 4 which is provided coaxially with the input shaft 2, and which transmits the drive force to the rear road wheels not illustrated in the drawing through the H/L changeover mechanism 3; the center differential gear unit 41 which is provided to the front edge portion of the rotary shaft 4, and which appropriately distributes the driving power of the rotary shaft 4 to the front and rear road wheels not illustrated in the drawing; the rear output shaft 47 which receives the driving power from the rotary shaft 4 and transmits the power to the rear road wheel side; the intermediate shaft 48 which receives the driving power from the rotary shaft 4; the front road wheel side output shaft 49 which receives the driving power from the rotary shaft 4 through the intermediate shaft 48 and transmits the power to the front road wheel side; the center differential gear unit control mechanism 19 which is defined as the first clutch mechanism capable of changing over the center differential gear unit 41 between the state in which the center differential gear unit is free and the state in which the unit is locked; and the 2/4 changeover mechanism 20 which is defined as the second clutch mechanism capable of changing over between the two-wheel drive and the four-wheel drive by transmitting the driving power of the rotary shaft 4 to the front road wheel side output shaft 49 or intercepting the driving power.

The said center differential gear unit 41 is composed of: the pinion shaft 42 which is connected with the rotary shaft 4 and rotated around the rotary shaft 4; a pair of pinions 43,44 which are provided to both edge portions of the pinion shaft 42; and a pair of side-gears 45,46 which respectively engages with the pinions 43,44. One of the side-gears 45 is connected with the front edge portion of the rear road wheel side output shaft 47, and the other side-gear 46 is connected with the rear edge portion of the intermediate shaft 48. The intermediate shaft 48 is a tubular shaft through which the rotary shaft 4 passes, and the front road wheel side output shaft 49 is a tubular shaft through which the intermediate shaft 48 passes. The rotary shaft 4, the intermediate shaft 48, and the front road side output shaft 49 are coaxially arranged and can be rotated independently.

Figure 3:
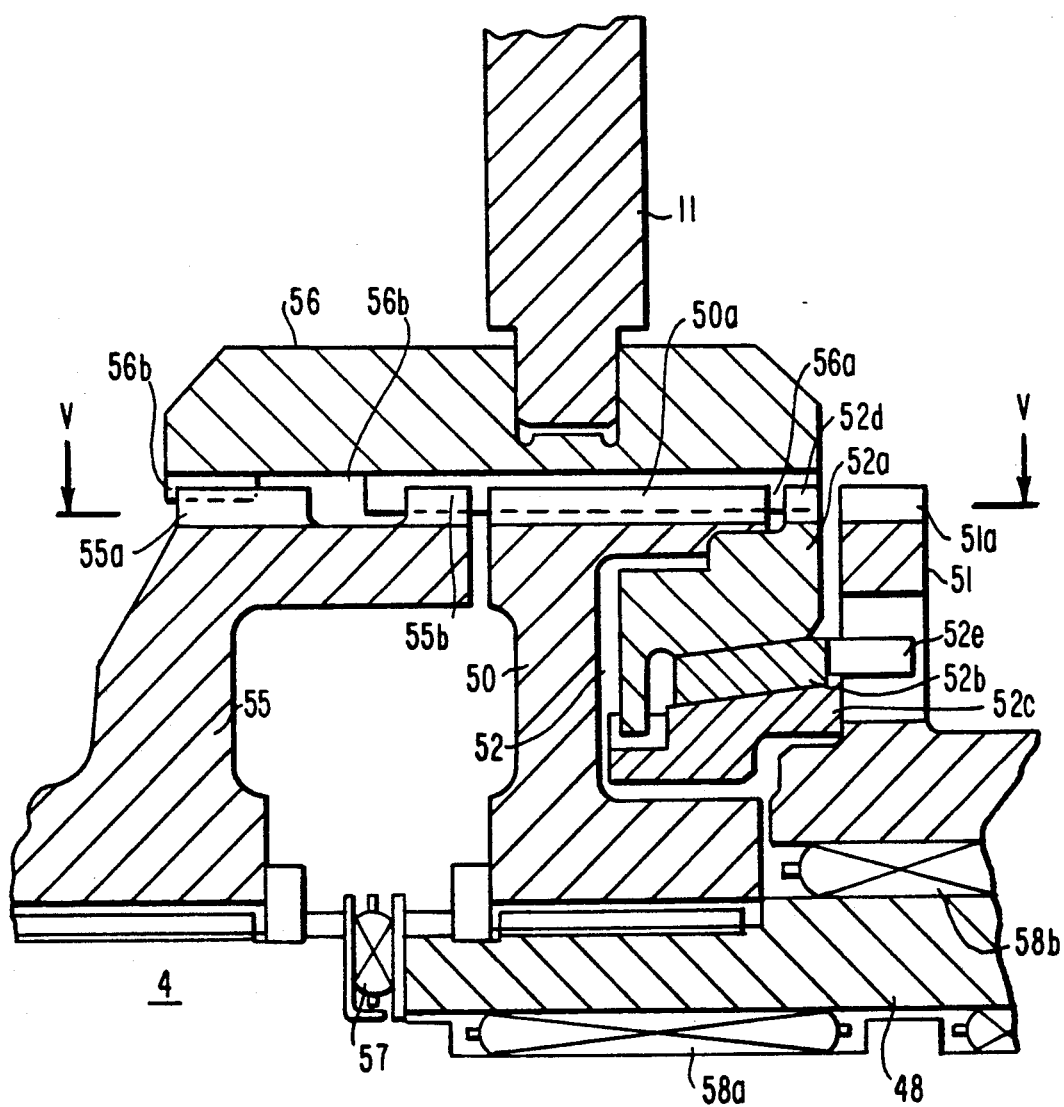
FIG. 3 is a partly enlarged sectional view of the operation system of the changeover sleeve.

As illustrated in FIG. 3 in which the composition of the operation system of the changeover sleeve is shown, the said center differential gear unit control mechanism 19 is composed of: the differential gear lock hub 55 which is defined as the second hub and provided to the rotary shaft 4; the 2/4 changeover hub 50 which is defined as the first hub and provided to the front edge portion of the intermediate shaft 48; and the 2/4 changeover sleeve 56 which is provided around the outer circumference of the differential lock hub 55 and the 2/4 changeover hub 50.

As illustrated in FIG. 3, the said 2/4 changeover mechanism 20 is composed of: the 2/4 changeover hub 50; the synchronizing mechanism 52 which is provided between the intermediate shaft 48 and the front road wheel side output shaft 49; the front road wheel side hub 51 which is formed on the front edge portion of the front road wheel side output shaft 49; the front drive sprocket clutch gear 51a (which will be called the clutch gear hereinafter) which is formed on the outer circumferential surface of the front road wheel side hub 51, and which composes a portion of the synchronizing mechanism 52; and the 2/4 changeover sleeve 56 which is provided around the outer circumferential surface of the 2/4 changeover hub 50 and the clutch gear 51a. The outer synchronizer ring clutch gear 52d (which will be called the auxiliary clutch gear hereinafter) is provided between the engagement teeth of the 2/4 changeover hub 50 and the clutch gear 51a. The hubs 55,50 and clutch gears 52d,51a are provided with the engagement teeth of the same diameter, and they are arranged closely to each other in the order described above. The differential lock hub 55 is spline-connected with the rotary shaft 4. The 2/4 changeover hub 50 is spline-connected with the intermediate shaft 48. Further, the differential lock hub 55 is provided with the engagement teeth 55a,55b which can be engaged with the first engagement teeth 56a and the second engagement teeth 56b of the 2/4 changeover sleeve 56. The 2/4 changeover hub 50 is provided with the engagement teeth 50a which can be engaged with the first engagement teeth 56a and the second engagement teeth 56b of the 2/4 changeover sleeve 56.

As explained above, the internal circumferential surface of the 2/4 changeover sleeve 56 which functions both as a portion of the center differential gear unit control mechanism 19 and a portion of the 2/4 changeover mechanism 20, is provided with the first engagement teeth 56a and the second engagement teeth 56b, wherein the first engagement teeth 56a is formed on the rear side of the 2/4 changeover sleeve 56 and the second engagement teeth 56b is formed on the front side. The second engagement teeth 56b can be engaged with the differential lock hub 55, and the first engagement teeth 56a can be engaged with the differential lock hub 55, the 2/4 changeover hub 50, and the clutch gears 52d,51a. The annular groove 56c is formed between the first engagement teeth 56a and the second engagement teeth 56b so that the first engagement teeth 56a can not come into contact with the engagement teeth 55a of the differential lock hub 55. When the H/L changeover sleeve 8 is in position H, the 2/4 changeover sleeve 56 is shifted by the 2/4 shift fork 11 so that it can be changed over among: the high speed two-wheel drive position (which will be described as 2H hereinafter) in which the center differential gear unit 41 is locked; the high speed four-wheel drive position (which will be described as 4H Free hereinafter) in which the center differential gear 41 is free; and the high speed four-wheel drive position (which will be described as 4H Lock hereinafter) in which the center differential gear 41 is locked.

Therefore, the engagement teeth 56a and 56b of the 2/4 changeover sleeve 56 are arranged at appropriate axial positions (which is the right and left directions in the drawing) with regard to the hubs 55,50 and the clutch gears 52d, 51a. As illustrated in FIG. 5 which is a view taken in the direction of arrows V—V in FIG. 3, in this example, effective length L of the engagement teeth 56a is set to be appropriately longer than distance 1 between the edge portion (which is point $P_1$) of the effective teeth of the differential lock hub 55 and the edge portion (which is point $P_2$) of the effective teeth of the clutch gear 51a. The relation between L and 1 is given by $$L > 1.$$

In the way described above, when the 2/4 sleeve 56 is set to position 2H, the first engagement teeth 56a of the 2/4 changeover sleeve 56 is engaged with the differential lock hub 55 and the 2/4 changeover hub 50 so that the clutch gear 51a a becomes free. When the 2/4 changeover sleeve 56 is set to position 4H Free, the first engagement teeth 56a of the 2/4 changeover sleeve 56 is engaged with the 2/4 changeover hub 50 and the clutch gear 51a so that the differential lock hub 55 becomes free. Further, when the 2/4 changeover sleeve 56 is set to position 4H Lock, the second engagement teeth 56b of the 2/4 changeover sleeve 56 is engaged with the differential lock hub 55, so that the first engagement teeth 56a can be engaged with the 2/4 changeover hub 50 and the clutch gear 51a.

The said synchro-mesh unit 52 is provided with: the outer synchronizing ring 52a which is spline-connected with the 2/4 changeover hub 50; the inner synchronizing ring 52c which is spline-connected with the outer synchronizing ring 52a; the synchronizer cone 52b which is pinched by the synchronizing rings 52a,52c; and the clutch gear 51a with which the protrusion 52e formed on the edge portion of the synchronizer cone 52b is engaged. The said auxiliary clutch gear 52d is formed on the outer circumferential surface of the outer synchronizing ring 52a.

In the way described above, frictional cone clutches are respectively formed between the outer synchronizing ring 52a and the synchronizer cone 52b, and between the synchronizer cone 52b and the inner synchronizing ring 52c. The 2/4 changeover hub 50 and the clutch gear 51a are synchronously rotated by the frictional force of the frictional cone clutch.

The numeral 57 in FIG. 3 is a thrust bearing and the numerals 58a,58b are needle bearings.

As illustrated in FIG. the front road wheel drive system 80 to which the front wheel drive shaft 13 is connected, comprises: the drive shaft 81 which drives the front road wheel; a differential gear unit not shown in the drawing which is provided between the drive shaft 81 and the front wheel drive shaft 13; and the free wheel hub 83 which can intercept the drive force transmitted from the front wheel drive shaft 13 to the drive shaft 81. The free wheel hub 83 is provided with the free wheel hub changeover actuator 84 which drives the free wheel hub 83 using negative pressure of the engine.

In FIG. 1, the numeral 85 is a free wheel hub switch which detects the state of connection and disconnection of the free wheel hub 83. The numeral 86 is a solenoid valve which controls the supply of negative pressure to the free wheel hub changeover actuator 84. The numeral 87 is a surge tank. The numeral 88 is a one-way valve which is connected with the portion of the engine in which negative pressure is generated. The said free wheel hub 83 changes over the state between the states of transmission and interception of driving power in accordance with the condition of vehicle acceleration so that ratcheting noise from the free wheel hub 83 can not be made. The numeral 93 is an electronic control unit which controls the said solenoid valve 86 according to the signal sent from each detection switch. The numeral 92 is a driving condition indicating lamp. The numeral 91 is a shift lever of the transmission. The numeral 94a is a 2/4 detection switch which detects the changeover between the two-wheel drive state and the four-wheel drive state. The numeral 94b is a center differential gear lock detection switch which detects whether the center differential gear unit 41 is locked or not. The numeral 94c is an H/L detection switch which detects whether the transmission is in the state of high speed or low speed.

Next, the drive unit of the 2/4 shift fork 11 which shifts the 2/4 changeover sleeve 56 will be explained as follows.

As illustrated in FIG. 4 which is an enlarged sectional view of the main portion of the power transfer having a center differential gear unit of this example, from the leading edge of the 2/4 shift fork 11 is engaged with the groove formed on the changeover sleeve 56. On the other hand, the base edge portion 11a of the 2/4 shift fork 11 is slidably supported by the 2/4 shift rail 17 in such a way that the 2/4 shift fork 11 can be slid in the right and left directions (which will be called the axial direction hereinafter) in FIG. 4 with regard to the shift rail 17. The 2/4 shift rail 17 is slidably supported in such a manner that it can be slid in the axial direction with regard to the casing 100. The shift lag 101 is fixed to the 2/4 shift rail 17 through the pin 102. The shift lag 101 is provided with a groove which engages with the lower edge portion of the transfer lever 29, and when a driver manipulates the transfer lever 29, the 2/4 shift rail 17 is moved in the axial direction. In this case, the 2/4 shift rail 17 can be moved so that it can be shifted to either of the three positions of 2H, 4H Free and 4H Lock. The half-locking mechanism 18 is provided so that the movement of the shift rail 17 can be moderately restricted.

This half-locking mechanism 18 is supported by the casing 100 and composed of the ball 103 pressed against the 2/4 shift rail 17 by the spring not illustrated and the concave portions 17a,17b,17c which are hemispherically formed at a predetermined positions on the shift rail 17. When the ball 103 is engaged with one of the concave portions 17a to 17c, the 2/4 shift rail 17 is locked.

The said 2/4 shift fork 11 is provided to the shift rail 17 through the waiting mechanism 104 having resilient member. A pair of sleeves 105,106 which are slidably engaged with the 2/4 shift rail 17, are provided between the base edge portion 11a of the 2/4 shift fork 11 and the shift lag 101. The compression coil spring 107, which is a resilient member, is provided between a pair of sleeves 105,106 so that the sleeves 105 and 106 can be separated from each other. The 2/4 shift rail 17 is provided with the stepped portion 17d which comes into contact with one 106 of the sleeves. When the other sleeve 105 comes into contact with the cylindrical portion of the shift lag 101 and one sleeve 106 comes into contact with the stepped portion 17d in the free state, the positions of a pair of sleeves 105,106 are regulated and gap C can be formed between a pair of sleeves 105,106. The base edge portion 11a of the 2/4 shift fork 11 can contact with the flange portion of the sleeve 106 which comes into contact with the stepped portion 17d of the 2/4 shift rail 17.

A pair of sleeves 108,109 are slidably engaged with the 2/4 shift rail 17 on the right side of the base edge portion 11a of the 2/4 shift fork 11 The compression coil spring 110 is provided between a pair of sleeves 108,109 so that the sleeves 108,109 can be separated from each other by the spring force. The base edge portion 11a of the 2/4 shift fork 11 comes into contact with one 108 of the sleeves. The snap ring 11 fixed to the 2/4 shift rail 17 comes into contact with the other sleeve 109 so that the 2/4 shift fork 11 can be pushed in the left direction in FIG. 4 with regard to the 2/4 shift rail 17 by the spring force of the compression spring 110. In this case, the spring force of the compression coil spring 110 is set lower than that of the said compression coil spring 107, and the compression coil spring 110 presses against the base edge portion 11a of the 2/4 shift fork 11 against the flange portion of the said sleeve 106.

When the distance between the concave portion 17a corresponding to position 2H and the concave portion 17b corresponding to position 4H Free is represented by B, and as illustrated in FIG. 5 when the distance between the engagement teeth 56a of the 2/4 sleeve 56 and the edge portion of the effective teeth of the clutch gear 51a in position 2H is represented by A, the positions are set so that the relation can be given by $$(B-C)>A.$$

The reason why the positions are set in the way described above will be explained later.

On the other hand, an H/L shift fork not illustrated which moves the H/L changeover sleeve 8, is provided to an H/L shift rail which is supported in parallel with the said 2/4 shift rail 17. The H/L shift fork is driven by the said transfer lever 29 so that the state of the transfer can be changed over between Lock Position 4H and Position 4L in which the center differential gear unit is locked in the state of low speed four-wheel drive, wherein the changeover is conducted through the neutral position.

In the condition illustrated in FIG. 4, the 2/4 changeover sleeve 56 is in Position 2H and engaged with the differential lock hub 55 and the 2/4 changeover hub 50, so that the front road wheel side hub 51 becomes free.

Accordingly, the drive force of the output shaft 4 is not transmitted to the front road wheel side output shaft 49, but transmitted only to the rear road wheel side output shaft 47. Since the rotary shaft 4 and the intermediate shaft 48 are integrally rotated, the pinion shaft 42 of the pinion gears 43,44 and the side gear 46 are connected, so that the rotation of the pinions 43,44 is restricted and the center differential gear unit 41 is locked. As a result, the drive force transmitted from the output shaft 4 is directly transmitted to the rear road wheel side output shaft 47.

The 2/4 shift rail 17 is shifted to 4H Free Position by the manipulation of the transfer lever 29 as illustrated in FIG. 6 and FIG. 7. When the sliding resistance of the 2/4 changeover sleeve 56 is so large, the waiting mechanism 104 is activated, and the shift fork 11 is not moved together with the 2/4 shift rail 17 until the gap between the sleeves 105,106 is reduced. When the auxiliary clutch 52d of the synchronizing mechanism 52 is pushed by the spring force of the compression coil spring 107 located between the sleeves 105,106 and the phases of the auxiliary clutch 52d, the clutch gear 51a and the 2/4 changeover sleeve 56 coincide, the 2/4 shift fork 11 and the 2/4 changeover sleeve 56 are moved.

When the 2/4 shift rail 17 is moved to 4H Free Position and the ball 103 is engaged with the concave portion 17b as illustrated in FIG. 8 and FIG. 9, the relations of A, B and C can be represented by the following inequality.

$$(B-C)>A$$

Therefore, the front edge of the 2/4 changeover sleeve 56 is actually located at the position where it is engaged with the clutch gear 51a. The relations between L and l can be represented as follows.

$$L>l$$

Consequently, the engagement teeth 56a of the 2/4 changeover sleeve 56 are engaged with all of the differential lock hub 55, the 2/4 changeover hub 50 and the clutch gear 51a, so that the center differential gear unit 41 is locked in the state of four-wheel drive and the rotation of the front road wheel is synchronized with that of the rear road wheel. As explained above, in the process to proceed to 4H Free Position, the center differential gear 41 is transitionally locked, so that the 2/4 changeover sleeve 56 and the clutch gear 51a can be smoothly engaged and the occurrence of ratcheting noise can be inhibited.

When the relations of A, B and C are set according to the following inequality, $$(B-C)>A,$$

even if the 2/4 shift rail 17 is held at 4H Free Position, there is left a gap between the sleeve 105,106, so that the 2/4 changeover sleeve 56 and the clutch gear 51a are finally engaged by the spring force of the compression spring 107. However, when the sliding resistance of the 2/4 sleeve 56 is higher than the spring force of the compression coil spring 107, or when the squeezing force of the clutch gear 51a is stronger than the spring force of the compression coil spring 107, or when the rotation of the clutch gear 51a is decreased due to the viscosity resistance, it becomes difficult to engage the 2/4 changeover sleeve 56 with the clutch gear 51a, and ratcheting noise is made at position P where 2/4 changeover sleeve 56 engages with the clutch gear 51a as illustrated in FIG. 10.

Figure 11:
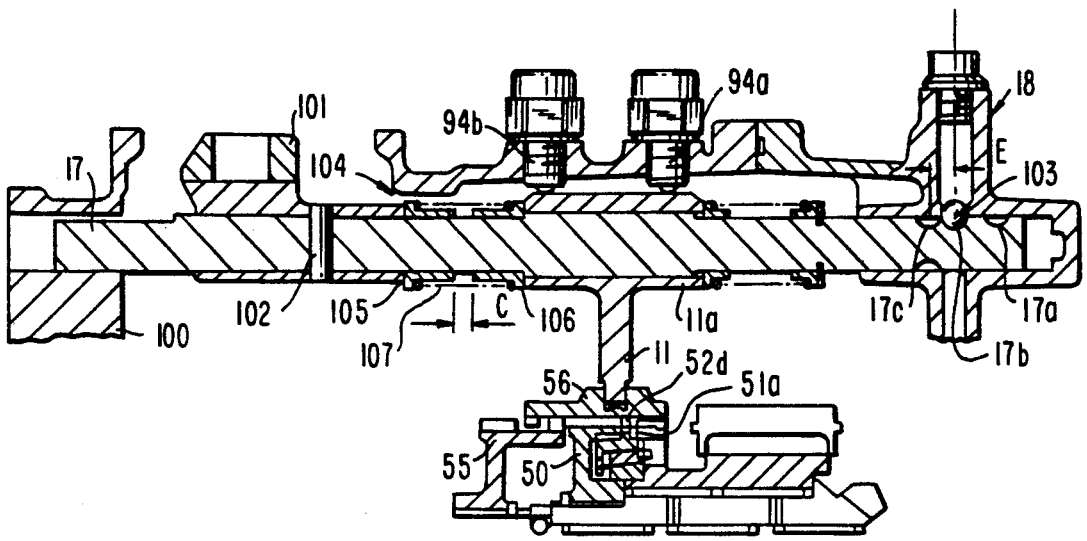
Figure 12:
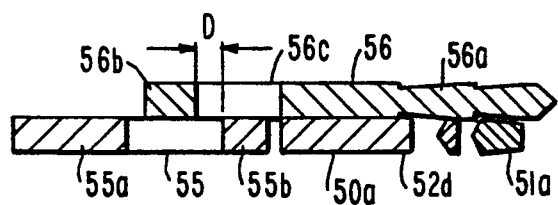

Next, the state of the 2/4 changeover sleeve 56 is changed from 4H Lock Position illustrated in FIG. 8 and FIG. 9 to the state illustrated in FIG. 11 and FIG. 12 in such a manner that the sleeve 106 moves the 2/4 shift fork 11 by the spring force of the spring 107 of the waiting mechanism 104. In this state, the 2/4 changeover sleeve 56 is not engaged with the differential lock hub 55, so that the center differential gear 41 becomes free.

Further, the 2/4 shift rail 17 is moved to 4H Lock Position by manipulating the transfer lever 29. Then, as illustrated in FIG. 13 and FIG. 14, when the phases of the spline of the 2/4 changeover sleeve 56 and the spline of the differential lock hub 55 do not coincide, the 2/4 changeover sleeve 56 is not moved and the slip between the 2/4 shift rail 17 and the 2/4 changeover sleeve 56 can be absorbed by the elastic deformation of the compression coil spring 107 of the waiting mechanism 104. As illustrated in FIG. 11 and FIG. 12, in 4F Free Position, D is defined as the gap between the second engagement teeth 56b of the 2/4 changeover sleeve 56 and the engagement teeth 55b of the differential lock hub 55, and E is defined as the distance between the concave portion 17b corresponding to 4H Free Position and the concave portion 17c corresponding to 4H Lock Position. The relations of C, D and E are set as follows.

$$E = C + D$$

Figure 15:
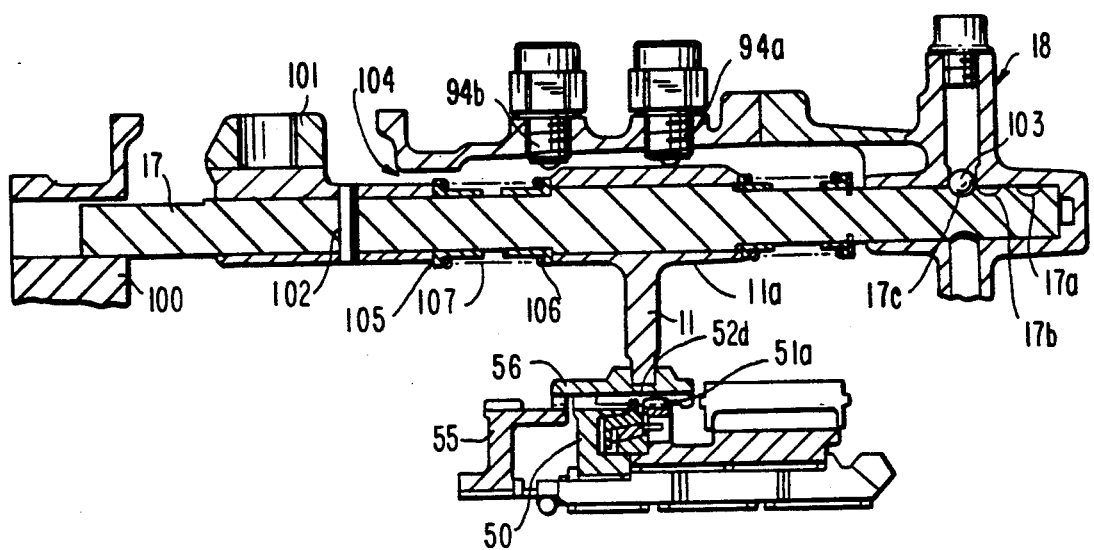
Figure 16:
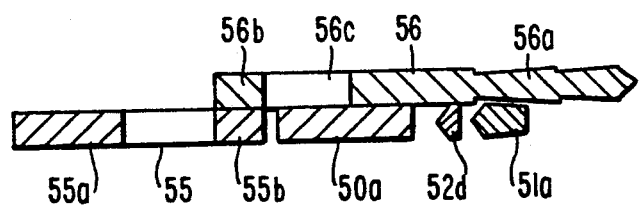
Figure 17:
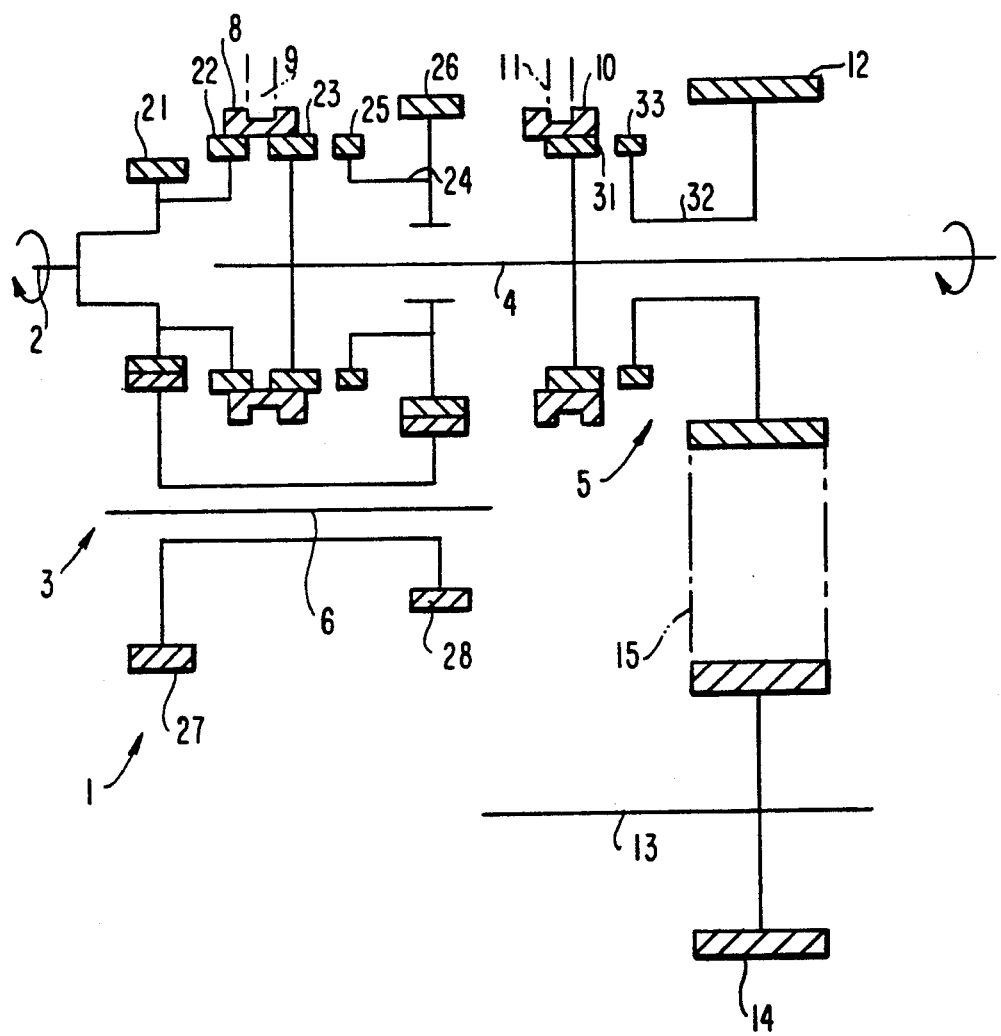
FIG. 17 is a diagrammatical view of the drive system of a conventional four-wheel drive vehicle of part-time four-wheel drive type.

Accordingly, it is possible to move the 2/4 shift rail 17 from 4H Free Position to 4H Lock Position even though the 2/4 changeover sleeve 56 is not moved at all. When the phase of the spline of the 2/4 changeover sleeve 56 coincides with the phase of the spline of the differential lock hub 55, the 2/4 changeover sleeve 56 is moved in the right direction in the drawing by the spring force of the compression coil spring 107 as illustrated in FIG. 15 and FIG. 16 so that the 2/4 changeover sleeve 56 can be engaged with the differential lock hub 55 and the state of 4H Lock is generated.

In the way explained above, since the 2/4 shift fork 11 is provided to the 2/4 shift rail 17 through the waiting mechanism 104, it is possible to move the 2/4 changeover sleeve 56 at an appropriate timing. Accordingly, even when the vehicle is running, the state of the power transfer can be smoothly changed over among the states of 2H, 4H Lock and 4H Free.

The present invention is applied to a two-speed power transfer in this example. However, it is possible to apply the present invention to a power transfer in which the changeover between a high speed and a low speed is not conducted. In this example, the present invention is applied to a vehicle of rear wheel drive type in which rear road wheels are driven when the power transfer is changed over to the state of two-wheel drive. However, it is possible to apply the present invention to a vehicle of front wheel drive in which front road wheels are driven when the transmission is changed over to the state of two-wheel drive.

What is claimed is:

1. A power transfer device having a center differential gear unit for use in a four-wheel drive vehicle comprising a rotary shaft to transmit the driving power of an engine;

said center differential gear unit is connected with said rotary shaft and distributes the driving power from said engine to front and rear road wheels of the vehicle;

an intermediate shaft which is connected with one of the output elements of said center differential gear unit, and which is rotatably provided around said rotary shaft, said intermediate shaft being connected with said rotary shaft through a first clutch mechanism in such a manner that said intermediate shaft can be connected with and disconnected from said rotary shaft, and an output shaft which is rotatably provided around said intermediate shaft, and which is detachable connected with said intermediate shaft through a second clutch mechanism having a synchronizing mechanism in such a manner that the output shaft can be connected with and disconnected from said intermediate shaft;

wherein said first clutch mechanism is composed of a first hub having external teeth mounted on said intermediate shaft, a sleeve having internal teeth slidably spline connected to the teeth of said first hub, a second hub having external teeth mounted on said rotary shaft and which can be selectively engaged with and disengaged from said teeth of said sleeve;

said second clutch mechanism being composed of said first hub, said sleeve, and a clutch gear mounted on said output shaft, which can be selectively connected with and disconnected from said sleeve through external teeth of said synchronizing mechanism of said clutch gear;

wherein said first hub, said second hub, and said clutch gear are arranged with respect to the axis of said rotary shaft in the order of said second hub, said first hub, and said clutch gear;

said sleeve being movable between a first position in which said internal teeth of said sleeve engage with said external teeth of said first hub and said external teeth of said second hub;

a second position in which said internal teeth of said sleeve engage with said external teeth of said first hub and said external teeth of said synchronizing mechanism of said clutch gear; and a third position in which said internal teeth of said sleeve engage with said external teeth of said first hub, said external teeth of said second hub, and said external teeth of said synchronizing mechanism of said clutch gear;

said sleeve having an internal annular groove, the width of which is greater than the width of said external teeth of said second hub, and within which said engagement teeth of said second hub are positioned when said sleeve is in said second position, and wherein said internal teeth of said sleeve extend by a distance greater than the distance between said external teeth of said second hub and said external teeth of said synchronizing mechanism of said clutch gear.

2. A power transfer device having a center differential gear unit for use in a four-wheel drive vehicle comprising a rotary shaft to transmit the driving power of an engine;

said center differential gear unit is connected with said rotary shaft and distributes the driving power from said engine to front and rear road wheels of the vehicle;

an intermediate shaft which is connected with one of the output elements of said center differential gear unit, and which is rotatably provided around said rotary shaft, said intermediate shaft being connected with said rotary shaft through a first clutch mechanism in such a manner that said intermediate shaft can be connected with and disconnected form said rotary shaft, and an output shaft which is rotatably provided around said intermediate shaft, and which is detachable connected with said intermediate shaft through a second clutch mechanism having a synchronizing mechanism in such a manner that the output shaft can be connected with and disconnected from said intermediate shaft;

wherein said first clutch mechanism is composed of a first hub having external teeth mounted on said intermediate shaft, a sleeve having internal teeth slidably spline connected to the teeth of said first hub, a second hub having external teeth mounted on said rotary shaft and which can be selectively engaged with and disengaged from said teeth of said sleeve;

said second clutch mechanism being composed of said first hub, said sleeve, and a clutch gear mounted on said output shaft, which can be selectively connected with and disconnected from said sleeve through external teeth of said synchronizing mechanism of said clutch gear;

wherein said first hub, said second hub, and said clutch gear are arranged with respect to the axis of said rotary shaft in the order of said second hub, said first hub, and said clutch gear;

said sleeve being movable between a first position in which said internal teeth of said sleeve engage with said external teeth of said first hub and said external teeth of said second hub;

a second position in which said internal teeth of said sleeve engage with said external teeth of said first hub and said external teeth of said synchronizing mechanism of said clutch gear; and a third position in which said internal teeth of said sleeve engage with said external teeth of said first hub, said external teeth of said second hub, and said external teeth of said synchronizing mechanism of said clutch gear;

said sleeve having an internal annular groove, the width of which is greater than the width of said external teeth of said second hub, and within which said engagement teeth of said second hub are positioned when said sleeve is in said second position, and wherein a spring loaded shift fork is operative to move said sleeve in a direction to couple said first hub and said clutch gear.

3. The power transfer device of claim 2, wherein the relations of a distance A, a distance B and a distance C are given by $$B - C > A$$

where

A is the distance between an outer radial side edge of said clutch gear and an outer radial side edge of said first hub when said sleeve is set at said first position;

where

B is the travel distance of a shift rail to move said sleeve from said first position to a second position; and, where C is the maximum travel distance of said shift fork relative to said shift rail.

4. The power transfer device of claim 3, wherein the relations of said distance C, said distance D and a distance E are be given by $$E - C + D$$

where

D is the distance between an outer radial side edge of said clutch gear, and an outer radial edge of said second hub when said sleeve is set at said second position; and, where E is the travel distance of said sift rail to move said sleeve from said second position to said third position.

5. A power transfer device having a center differential gear unit for use in a four-wheel drive vehicle comprising a rotary shaft to transmit the driving power of an engine;

said center differential gear unit is connected with said rotary shaft and distributes the driving power from said engine to front and rear road wheels of the vehicle;

an intermediate shaft which is connected with one of the output elements of said center differential gear unit, and which is rotatably provided around said rotary shaft, said intermediate shaft being connected with said rotary shaft through a first clutch mechanism in such a manner that said intermediate shaft can be connected with and disconnected form said rotary shaft, and an output shaft which is rotatably provided around said intermediate shaft, and which is detachable connected with said intermediate shaft through a second clutch mechanism having a synchronizing mechanism in such a manner that the output shaft can be connected with and disconnected from said intermediate shaft;

wherein said first clutch mechanism is composed of a first hub having external teeth mounted on said intermediate shaft, a sleeve having internal teeth slidably spline connected to the teeth of said first hub, a second hub having external teeth mounted on said rotary shaft and which can be selectively engaged with and disengaged from said teeth of said sleeve;

said second clutch mechanism being composed of said first hub, said sleeve, and a clutch gear mounted on said output shaft, which can be selectively connected with and disconnected from said sleeve through external teeth of said synchronizing mechanism of said clutch gear;

wherein said first hub, said second hub, and said clutch gear are arranged with respect to the axis of said rotary shaft in the order of said second hub, said first hub, and said clutch gear;

said sleeve being movable between a first position in which said internal teeth of said sleeve engage with said external teeth of said first hub and said external teeth of said second hub;

a second position in which said internal teeth of said sleeve engage with said external teeth of said first hub and said external teeth of said synchronizing mechanism of said clutch gear; and a third position in which said internal teeth of said sleeve engage with said external teeth of said first hub, said external teeth of said second hub, and said external teeth of said synchronizing mechanism of said clutch gear;

said sleeve having an internal annular groove, the width of which is greater than the width of said external teeth of said second hub, and within which said engagement teeth of said second hub are positioned when said sleeve is in said second position, wherein said synchronizing mechanism is a multi-synchronizing ring synchro-mesh unit including a plurality of frictional cone clutches providing a plurality of synchronizing rings.

* * * * *